(12) United States Patent
Baumann et al.

(10) Patent No.: US 6,983,828 B2
(45) Date of Patent: Jan. 10, 2006

(54) DISC BRAKE THAT IS ACTUATED BY MEANS OF A BAND BRAKE DEVICE

(75) Inventors: Dietmar Baumann, Hemmingen (DE); Hanniel Schmidt, Karlsbad (DE); Herbert Vollert, Vaihingen/Enz (DE); Frieder Keller, Ubstadt-Weiher (DE)

(73) Assignee: Robert Bosch GmbH, Stuttgart (DE)

( * ) Notice: Subject to any disclaimer, the term of this patent is extended or adjusted under 35 U.S.C. 154(b) by 605 days.

(21) Appl. No.: 10/089,053

(22) PCT Filed: Jul. 20, 2001

(86) PCT No.: PCT/DE01/02746

§ 371 (c)(1),
(2), (4) Date: Jun. 18, 2002

(87) PCT Pub. No.: WO02/10607

PCT Pub. Date: Feb. 7, 2002

(65) Prior Publication Data

US 2005/0098396 A1  May 12, 2005

(30) Foreign Application Priority Data

Aug. 2, 2000  (DE) ............................. 100 37 598.7

(51) Int. Cl.
*F16D 51/00* (2006.01)

(52) U.S. Cl. ................ 188/70 B; 188/77 W; 188/72.2; 188/72.8; 188/162

(58) Field of Classification Search ............. 188/70 R, 188/70 B, 72.2, 72.7, 72.8, 77 R, 77 W, 162
See application file for complete search history.

(56) References Cited

U.S. PATENT DOCUMENTS

| | | | | | |
|---|---|---|---|---|---|
| 1,814,574 | A | * | 7/1931 | Tatter | 188/77 R |
| 2,501,096 | A | * | 3/1950 | Robins et al. | 192/15 |
| 2,955,680 | A | * | 10/1960 | Caero | 188/70 B |
| 2,968,367 | A | * | 1/1961 | Burnett | 188/70 B |
| 3,403,753 | A | * | 10/1968 | Hooten | 188/70 R |
| 4,217,974 | A | * | 8/1980 | Holcomb, Jr. | 188/77 R |
| 4,721,190 | A |   | 1/1988 | Schmidt et al. | |
| 5,842,947 | A | * | 12/1998 | Weilant | 475/323 |
| 2004/0099491 | A1 | * | 5/2004 | Stevenson et al. | 188/77 W |

FOREIGN PATENT DOCUMENTS

| | | |
|---|---|---|
| AT | 330 653 B | 7/1976 |
| DE | 42 07 640 A | 9/1993 |
| GB | 706 604 A | 3/1954 |
| GB | 1 211 477 A | 11/1970 |

* cited by examiner

*Primary Examiner*—Robert A. Siconolfi
*Assistant Examiner*—Bradley T. King
(74) *Attorney, Agent, or Firm*—Michael J. Striker

(57) ABSTRACT

The invention relates to a friction brake (10) for a motor vehicle. The friction brake (10) for instance has a disk brake (12), which is actuatable by means of an actuating device, for instance in the form of a ball thread drive (22). The invention proposes embodying the friction brake (10) with a band brake (34), whose band (36) is mounted on the circumference of a nut (26) of the ball thread drive (22). If the brake band (36) is put under tensile stress in order to actuate the band brake (34), then the brake band (36) rotates the nut (26) of the ball thread drive (22) in a tensing direction and in this way actuates the disk brake (12). The invention has the advantage that the friction brake (10) has high brake boosting and therefore requires only little actuating energy. It is accordingly suitable for embodiment as an electromechanical friction brake (10) with an electric motor (56) for its actuation.

9 Claims, 2 Drawing Sheets

DISC BRAKE THAT IS ACTUATED BY MEANS OF A BAND BRAKE DEVICE

BACKGROUND OF THE INVENTION

The invention relates generally to a friction brake for a motor vehicle.

From German Patent Disclosure DE 42 07 640 A1, a friction brake embodied as a disk brake is known. The known friction brake has a brake disk as its brake body, against which a friction brake lining can be pressed to generate a braking moment or braking force. For pressing the friction brake lining against the brake body, the known friction brake has a piston, which is displaceable perpendicular to the brake disk by means of a wedge drive mechanism, by rotation about a piston axis, and which presses the friction brake lining against the brake disk.

A driving energy for rotating and displacing the brake piston is drawn from the rotatable brake body by a controllable, electromagnetic friction coupling. The friction coupling is embodied annularly and is disposed coaxially to a rotary axis of the brake body. A circular-disk-shaped coupling lining is mounted fixedly and coaxially to the brake body and rotates along with the brake body. An electromagnetic part, having a winding, of the friction coupling is embodied annularly and is disposed rotatably and coaxially to the brake body. Supplying electric current to the winding causes the electromagnetic part of the friction coupling to achieve frictional engagement with a coupling lining that is solidly attached to the brake body and rotates along with it, so that the electromagnetic part of the friction coupling is driven to a rotary motion by the brake body. A driving moment exerted on the electromagnetic part of the friction coupling by the brake body is dependent on an intensity of the current with which the winding of the electromagnetic friction coupling is supplied. The electromagnetic part of the friction coupling has a set of teeth, which meshes with a set of teeth of the piston of the actuating device, so that supplying current to the winding of the friction coupling drives the piston to rotate, thus pressing the friction brake lining against the brake body.

SUMMARY OF THE INVENTION

The friction brake of the invention having the characteristics of claim 1 has a band brake with a brake band that wraps around a rotatable brake body. When the friction brake is not actuated, the brake band wraps loosely around the brake body. To generate a braking moment or braking force, the brake band is tensed and thereby brakes the brake body. At the same time, a tensile stress acts on the brake band, which in the friction brake of the invention is utilized to press a friction brake lining against a rotatable brake body. The brake body can be the same brake body that has the brake band of the band brake wrapped around it, or a different brake body. The brake band of the band brake is operatively connected to the actuating device with which the friction brake lining can be pressed against the brake body. A tensile stress on the brake band drives the actuating device in such a way that the latter presses the friction brake lining against the brake body and thus generates a braking moment or braking force. The actuating device can be driven solely by the brake band of the band brake, or the tensile stress on the brake band acts in addition to a driving force exerted by external force and/or muscle power on the actuating device. The external force can for instance be applied by means of an electromagnet, while the muscle power is transmitted in a manner known per se, for instance hydraulically, to the actuating device of the friction brake.

The friction brake of the invention has the advantage that some of the energy required to generate a braking moment or braking force is drawn from the rotatable brake body to be braked. The friction brake of the invention has brake boosting in the sense that with a comparatively slight force exerted on the brake band, a high braking moment or major braking force can be generated. The band brake has a dual function: First, the band brake directly brakes the brake body that it wraps around. Second, the tensile stress exerted on the brake band is utilized to drive the actuating device and thus to press the friction brake lining against the brake body. Because the attainable brake boosting is high, the friction brake of the invention can be actuated with little energy. It can be embodied with low weight and a small size and has high dynamics upon its actuation. Another advantage of the friction brake of the invention is its good meterability.

Because of the low actuating energy that is possible and the high dynamics, the friction brake of the invention is especially well suited for embodiment as an electromechanical friction brake. Claim 8 therefore contemplates an electric motor for actuating the friction brake. The electric motor, preferably via a gear, exerts the requisite tensile force for actuating the friction brake on the brake band of the band brake of the friction brake of the invention. Because only little energy is required to actuate the friction brake, a small, lightweight electric motor of low current consumption suffices; this puts only a slight load on an on-board electrical system of a motor vehicle equipped with the friction brake of the invention. Nevertheless, because of the high dynamics and because of the brake boosting, a high braking moment or major braking force can be brought to bear quickly.

BRIEF DESCRIPTION OF THE DRAWING

The invention is described in further detail below in terms of an exemplary embodiment shown in the drawing. Shown are.

DETAILED DESCRIPTION OF THE PREFERRED EMBODIMENTS

Figure 2:
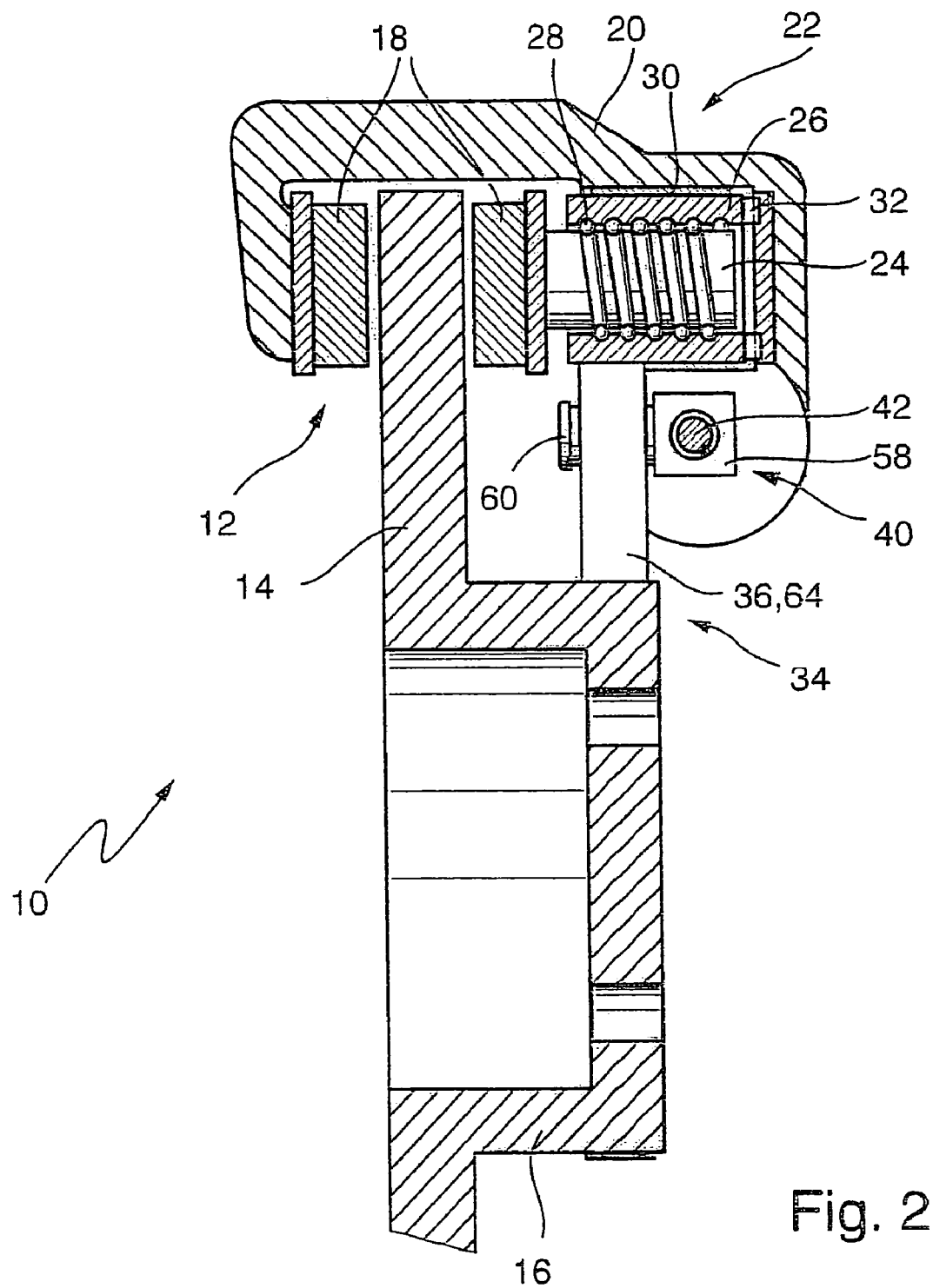
FIG. 2, an axial section of the friction brake taken along the line II—II in FIG. 1.

The friction brake of the invention, shown in the drawing and identified overall by reference numeral 10, has a disk brake 12 with a brake disk 14. The brake disk 14 is integral with a drum 10, which forms a hub of the brake disk 14 for connecting the brake disk 14 to a vehicle wheel, not shown, in a manner fixed against relative rotation. The brake disk 14 forms a brake body of the disk brake 12. For braking the brake disk 14, the disk brake 12 has two friction brake linings 18, which are received in a brake caliper 20. The brake caliper 20 is embodied as a floating caliper, so that by pressing the friction brake lining 18, shown on the right in FIG. 2, against one side of the brake disk 14, the other friction brake lining 18, shown on the left in FIG. 2, is pressed against the other side of the brake disk 14.

For pressing the friction brake linings 18 against the brake disk 14, the friction brake 10 has an actuating device in the form of a ball thread drive 22. The ball thread drive 22 has a spindle 24, a nut 26, and balls 28, which connect the nut 26 to the spindle 24 in a manner known per se, on the order of a screw thread. One friction brake lining 18 is mounted on one end of the spindle 24. The nut 26 is supported rotatably in the brake caliper 20 by a bearing bush 30 and is braced rotatably and axially on the brake caliper 20 via an axial roller bearing 32. Driving the nut 26 to rotate in a tensing direction displaces the spindle 24 axially in the direction of the brake disk 14 and presses the one friction brake lining 18 against the brake disk 14. A reaction force displaces the brake caliper 20 embodied as a floating caliper, so that the brake caliper 20 presses the other friction brake lining 18 against the other side of the brake disk 14. In this way, a braking moment is exerted on the brake disk 14 and the brake disk 14 is braked. For release, the nut 26 of the ball thread drive 22 is driven to rotate in the opposite direction (restoring direction), as a result of which the spindle 24 is displaced away from the brake disk 14, the brake linings 18 are lifted from the brake disk 14, and the disk brake 12 is released.

Besides the disk brake 12, the friction brake 10 of the invention, shown in the drawing, also has a band brake 34. The drum 16, which is integral with the brake disk 14 and also forms the hub of the brake disk 14, forms a brake body of the band brake 34. The band brake 34 has a brake band 36, which is wrapped around the drum 16. Two ends 38 of the brake band 36 are secured jointly to one point of a circumference of the nut 26 of the ball thread drive 22, which forms the actuating device of the disk brake 12. The two ends 38 of the brake band 36, coming from the drum 16 of the brake disk 14, are wrapped in the same circumferential direction around a portion of the circumference of the nut 26. If the brake band 36 is put under a tensile stress for the sake of braking, then the two ends 38 of the brake band 36 exert a torque in the tensing direction on the nut 26 of the ball thread drive 22.

To exert a tensile stress on the brake band 36, the band brake 34 has a tensing device 40. The tensing device 40 has a spindle 42, with a clockwise thread 44 and a counterclockwise thread 46. As can be seen from FIG. 1, the spindle 42 is disposed between the drum 16 of the brake disk 14 and the ball thread drive 22. As can be seen from FIG. 2, the spindle 42 is disposed laterally beside the brake band 36. One end of the spindle 42 is supported rotatably and axially displaceably in a bearing bush 48 that is inserted into a bore in the brake caliper 20. Another end of the threaded spindle 42 is connected axially displaceably but in a manner fixed against relative rotation to a (nonshiftable) shaft coupling 52 by means of a sliding spring 50. The sliding spring 50 rests displaceably in a groove of the spindle 42 and a groove in a bore 54 of the shaft coupling 52. The shaft coupling 52 is fixed against relative rotation to a shaft of an electric motor 56. With the electric motor 56, the spindle 42 of the tensing device 40 of the band brake 34 can be driven to rotate.

Figure 1:
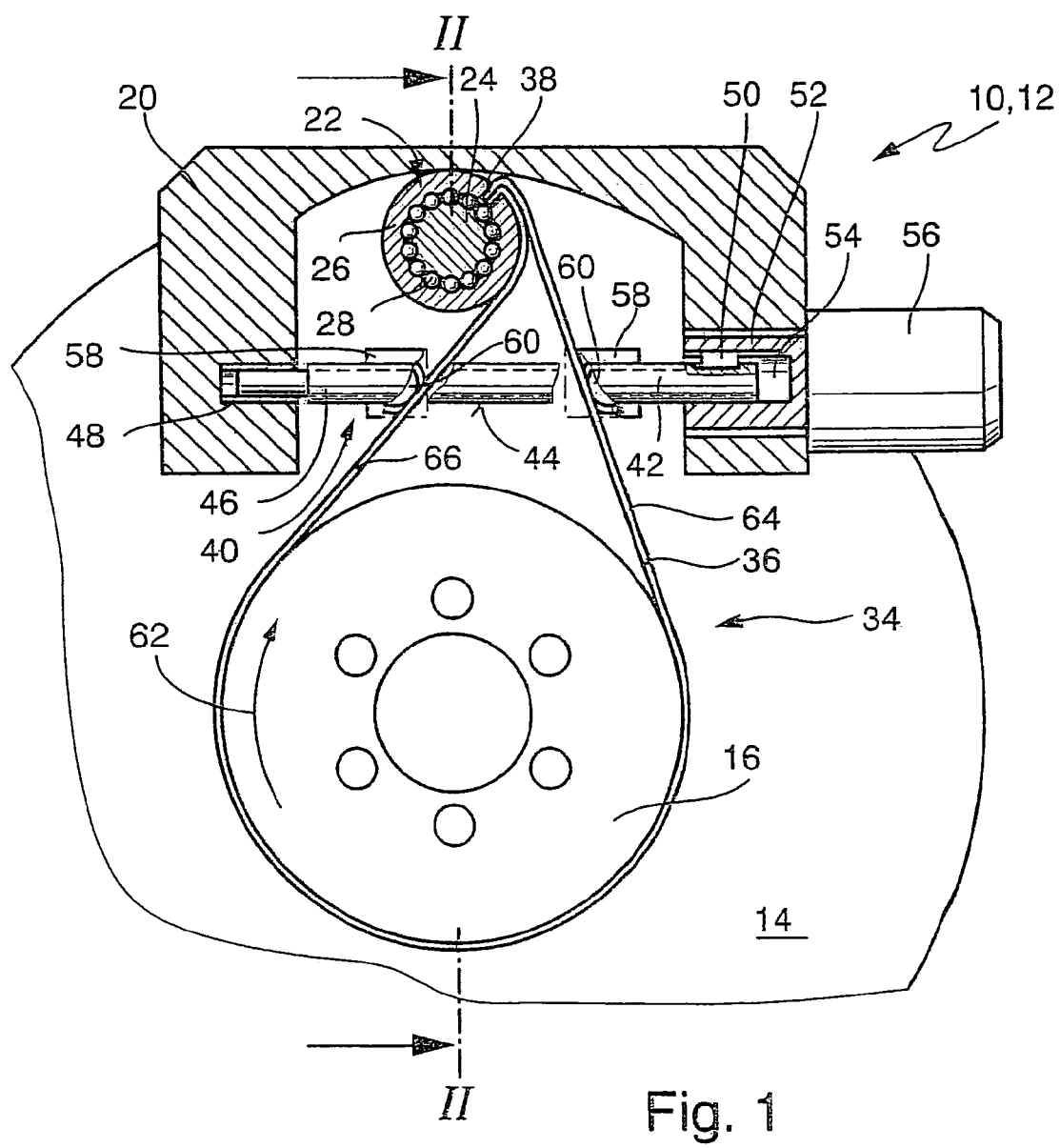
FIG. 1, an elevation view of a friction brake of the invention.

One nut 58 each is spaced on the clockwise thread 44 and the counterclockwise thread 46 of the spindle 42. The nuts 58 are shown partly cut away in FIG. 1, to make the course of the brake band 36 visible. Driving the spindle 42 to rotate by means of the electric motor 56 causes the two nuts 58 to move toward or away from one another, because of the clockwise and counterclockwise threads 44, 46 of the spindle 42. Two pegs 60 protrude to the side from the two nuts 58 and contact outer sides, facing away from one another, of the brake band 36. The two pegs 60 rest on two portions 64, 66 of the brake band 36, which lead from a circumference of the drum 16 of the brake disk 14 away to the circumference of the nut 26 of the ball thread drive 22. If the nuts 58 of the tensing device 40 are moved toward one another in a tensing direction by the fact that the spindle 42 is driven to rotate, then the pegs 60 press together the portions 64, 66 of the brake band 36, which lead from the drum 16 of the brake disk 14 to the nut 26 of the ball thread drive 22, and as a result put the brake band 36 under a tensile stress. The tensile stress causes friction between the brake band 36 and the drum 16 of the brake disk 14, and the brake band 36 exerts a braking moment on the drum 16. Assuming that the direction of rotation of the brake disk 14 with the drum 16 is as indicated by the arrow 26 in FIG. 1, the drum 16 by friction exerts a tension on the portion 64 of the brake band 36 on the right in FIG. 1, leading from the drum 16 to the nut 26 of the ball thread drive 22. Via the peg 60, this portion 64 of the brake band 36 braces the nut 58, on the right in FIG. 1, of the tensing device 40 against further displacement. Further rotation of the spindle 42 of the tensing device 40 displaces the spindle 42 axially as a consequence. With the spindle 42, the nut 58 shown on the left in FIG. 1 is displaced, and with its peg 60 it presses the portion 66 of the brake band 36, shown on the left in FIG. 1 and leading from the drum 16 of the brake disk 14 to the nut 26 of the ball thread drive 22, in the direction of the portion 64 of the brake band 36 shown on the right in FIG. 1. In this way, the tensile stress on the brake band 36 and thus the braking moment exerted by the brake band 36 on the drum 16 of the brake disk 14 can be increased in a metered way.

Since the two ends 38 of the brake band 36 engage the nut 26 of the ball thread drive 22 in the same circumferential direction, the two ends 38 of the brake band 36, put under tensile stress by the tensing device 40, exert a torque in the tensing direction on the nut 46 of the ball thread drive 22. The brake band 36 of the band brake 34, put under tensile stress by the tensing device 40 for the sake of braking, accordingly not only exerts a braking moment on the drum 16 of the brake disk 14; in addition, the brake band 36 put under tensile stress also drives the nut 26 of the ball thread drive 22 to execute a rotary motion in a tensing direction of the disk brake 12. When the brake band 36 is put under tensile stress, it presses the two friction brake linings 18 against the brake disk 14 via the ball thread drive 22 and thus also exerts a braking moment on the brake disk 14. The band brake 34 of the friction brake 10 of the invention, with its brake band 36, brakes the drum 16 of the brake disk 14 directly and, via the disk brake 12, it brakes the brake disk 14 indirectly. The result is major brake boosting, so that with a low torque exerted on the spindle 42 of the tensing device 40 of the band brake 34, a high braking moment can be exerted on the brake disk 14. As a result, a small electric motor 56 with little consumption of electric power is sufficient to actuate the friction brake 10 of the invention.

For releasing the friction brake 10, the electric motor 56 is driven in a restoring direction, so that the two nuts 58 of the tensing device 40 move apart from one another and release the tensile stress on the brake band 36. The brake band 36 wraps loosely around the drum 16 of the brake disk 14. With the disappearance of the tensile stress on the brake band 36, the disk brake 12 is released, so that the brake disk 14 is again freely rotatable.

It is possible for the ball thread drive 22 and the spindle 42 with the nuts 58 of the tensing device 40 of the band brake 34 to be made free of self-locking, so that the friction brake 10 of the invention releases automatically when the electric motor 56 is without current. In the exemplary embodiment of the invention shown and described, however, the spindle 42 with the nuts 58 of the tensing device 40 of the band brake 34 is embodied as self-locking, so that a braking moment of the friction brake 10 exerted in the tensing direction as a result of a supply of electric current to the electric motor 56 is maintained when the electric motor 56 is without electric current. This has the advantage that the electric motor 56 need not be supplied with electric current during braking in order to keep the braking moment constant; current is supplied to the electric motor 56 only in order to vary the braking moment. This lessens the current consumption of the electric motor 56 and also lessens the load on an on-board electrical system of a motor vehicle equipped with the friction brake 10. Heating of the electric motor 56 is also reduced, which makes a small-sized electric motor 56 possible. Another advantage of a self-locking embodiment of the spindle 42 with the nuts 58 is that the friction brake 10 can be used as a parking brake, which keeps a braking moment, created by supplying current to the electric motor 56, in force even if current does not continue to be supplied to the electric motor 56.

What is claimed is:

1. A friction brake, comprising:
 a rotatable brake body;
 a friction brake lining; and
 an actuating device with which the friction brake lining can be pressed against the brake body, wherein the friction brake lining (10) has a band brake (34), whose brake band (36) is operatively connected to the actuating device (22), so that a tensile stress on the brake band (36) drives the actuating device (22) in the direction of pressing the friction brake lining (18) against the brake body (14), wherein the actuating device has a screw gear (22) with a rotatable drive element (26) and with a power takeoff element (24), displaceable by rotation of the drive element (26), for pressing the friction brake lining (18) against the brake body (14), and wherein one end (38) of the brake band (36) eccentrically engages the drive element (26) of the screw gear (22).

2. The friction brake of claim 1, wherein the band brake (34) has a tensing device (40) with a tensing element (58, 60) for tensing the brake band (36), and the tensing element (58, 60) for tensing the brake band (36) can be pressed against a portion (64, 66) of the brake band (36) that leads away at a tangent from a drum (16) of the band brake (34).

3. The friction brake of claim 2, wherein the tensing device (40) of the band brake (34) has two tensing elements (58, 60), which for tensing the brake band (36) can be pressed against two portions (64, 66) of the brake band (36) that lead away from the drum (16) of the band brake (34).

4. The friction brake of claim 3, wherein the two tensing elements (58, 60) are movable toward one another and can be pressed against outer sides, facing away from one another, of the portions (64, 66) of the brake band (36) that lead away from the drum (16) of the band brake (34).

5. The friction brake of claim 2, wherein the tensing element (58, 60) has a nut (58), which is displaceable by driving a spindle (42) to rotate.

6. The friction brake of claim 3, wherein the two tensing elements (58, 60) each have one nut (58), and the two nuts (58) are disposed on a common spindle (42) with two opposed threads (44, 46) for the two nuts (58) and are displaceable in opposite directions by rotation of the spindle (42).

7. The friction brake of claim 5, wherein the spindle (42) is axially displaceable.

8. The friction brake of claim 5, wherein the tensing device (40) has an electric motor (56) for driving the spindle (42) to rotate.

9. The friction brake of claim 1, wherein the two ends (38) of the brake band (36) eccentrically engage the drive element (26) of the screw gear (22), so that a tensile stress on the brake band (36), via both ends (38) of the brake band (36), exerts a torque in the same direction on the drive element (26).

* * * * *